US011729690B2

(12) United States Patent
Yao et al.

(10) Patent No.: US 11,729,690 B2
(45) Date of Patent: Aug. 15, 2023

(54) PERFORMANCE MEASUREMENTS FOR MANAGEMENT OF NF SERVICE, PFD AND QOS FLOW RELEASES

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 17/089,406

(22) Filed: Nov. 4, 2020

(65) Prior Publication Data
US 2021/0120473 A1 Apr. 22, 2021

Related U.S. Application Data

(60) Provisional application No. 62/932,282, filed on Nov. 7, 2019.

(51) Int. Cl.
*H04W 36/30* (2009.01)
*H04W 36/00* (2009.01)
*H04W 36/36* (2009.01)

(52) U.S. Cl.
CPC ....... *H04W 36/30* (2013.01); *H04W 36/0079* (2018.08); *H04W 36/36* (2013.01)

(58) Field of Classification Search
CPC . H04W 36/30; H04W 36/0079; H04W 36/36; H04W 36/0083
See application file for complete search history.

(56) References Cited

U.S. PATENT DOCUMENTS

| 11,363,481 | B1* | 6/2022 | Feder ................. H04W 84/045 |
| 2020/0252810 | A1* | 8/2020 | Lee ......................... H04L 47/20 |
| 2021/0014141 | A1* | 1/2021 | Patil ..................... H04W 24/02 |
| 2021/0337432 | A1* | 10/2021 | Lee ................... H04W 36/0005 |
| 2022/0015023 | A1* | 1/2022 | De-Gregorio-Rodriguez .............. H04L 67/51 |

OTHER PUBLICATIONS

"5G; Procedures for the 5G System", 3GPP TS 23.502 version 15.2.0 Release 15 ETSI TS 123 502 V15.2.0, (Jun. 2018), 311 pgs.
"3GPP TS 32.401 V16.0.0 (Jul. 2020)", 3rd Generation Partnership ProjectTechnical Specification Group Services and System Aspects; Telecommunication management; Performance Management (PM);Concept and requirements Release 16), (Jul. 2020), 29 pgs.

(Continued)

*Primary Examiner* — Charles N Appiah
*Assistant Examiner* — Frank E Donado
(74) *Attorney, Agent, or Firm* — Schwegman Lundberg & Woessner, P.A.

(57) ABSTRACT

Systems and methods of providing performance measurements are described. The performance measurements reflect the performance of NF service management, PFD management, UE policy association, QoS flow release and handovers. Raw performance data is collected from one or more NFs and then measurement data results are provided to an NF measurement consumer. The measurement data results is used to diagnose ongoing issues impacting the performance of the mobile network and predict any potential issues.

21 Claims, 12 Drawing Sheets

(56) References Cited

OTHER PUBLICATIONS

"3GPP TS 32.404 V16.0.0(Jul. 2020)", 3rd Generation Partnership Project;Technical Specification Group Services and System Aspects;Telecommunication management;Performance Management (PM);Performance measurements Definitions and template(Release 16), (Jul. 15, 2020), 34 pgs.

"3GPP TS 23.501 V16.4.0", 3rd Generation Partnership Project; Technical Specification Group Services and System Aspects; System architecture for the 5G System (5GS);Stage 2(Release 16), (Mar. 2020), 430 pgs.

* cited by examiner

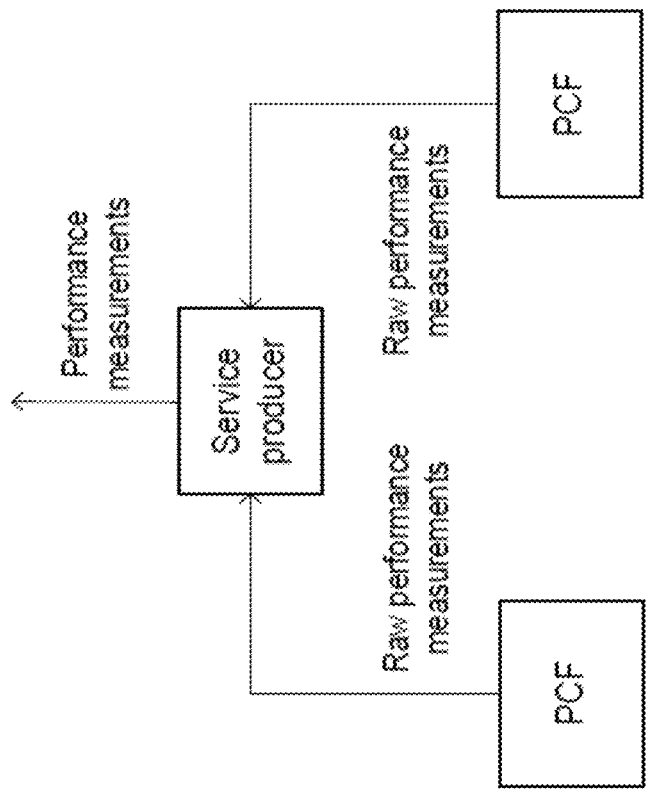
FIG. 5B
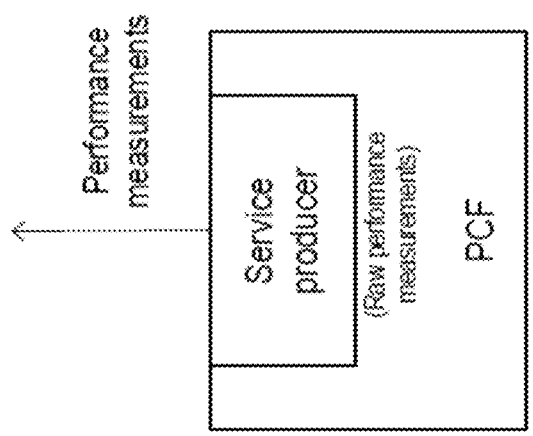

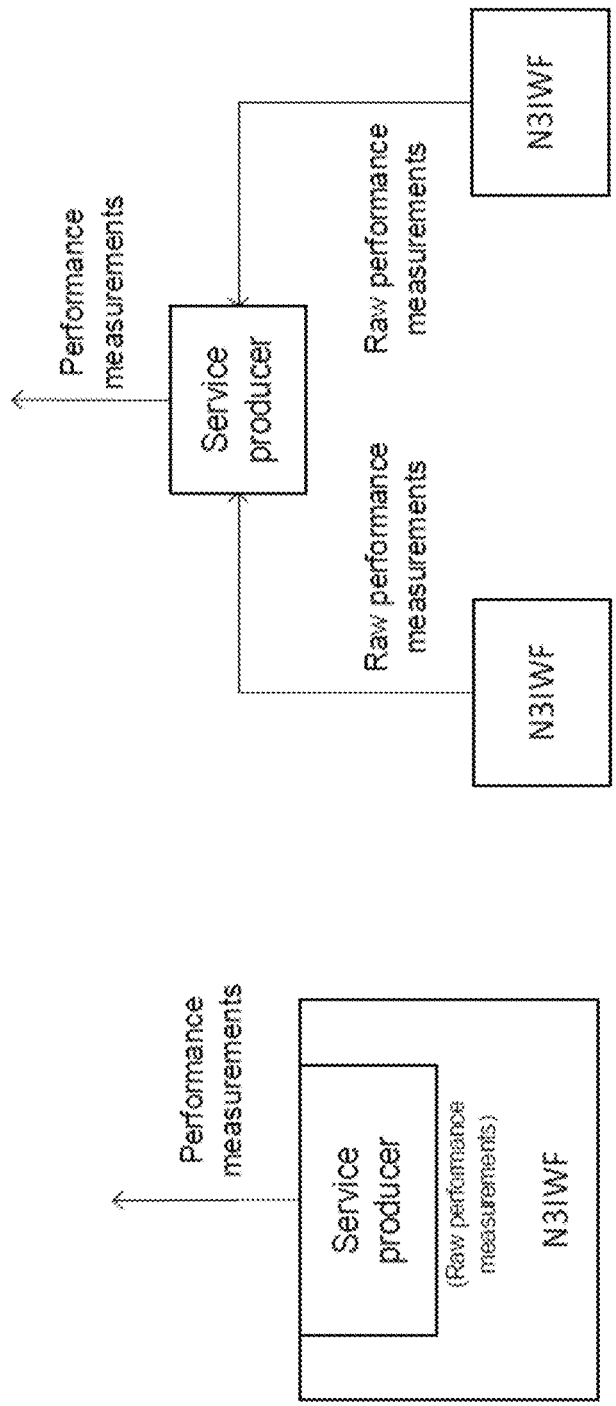

PERFORMANCE MEASUREMENTS FOR MANAGEMENT OF NF SERVICE, PFD AND QOS FLOW RELEASES

PRIORITY CLAIM

This application claims the benefit of priority under 35 U.S.C. 119(e) to U.S. Provisional Patent Application Ser. No. 62/932,282, filed Nov. 7, 2019, which is incorporated herein by reference in its entirety.

TECHNICAL FIELD

Embodiments pertain to radio access networks. Some embodiments relate to performance measurements for use in various radio access technologies (RATs) including cellular and wireless local area network (WLAN) networks, including Third Generation Partnership Project Long Term Evolution (3GPP LTE) networks and LTE advanced (LTE-A) networks as well as $4^{th}$ generation (4G networks and $5^{th}$ generation (5G) networks.

BACKGROUND

The use of 3GPP LTE systems (including LTE and LTE-Advanced systems) has increased due to both an increase in the types of devices user equipment (Ies) using network resources as well as the amount of data and bandwidth being used by various applications, such as video streaming, operating on these Ies. With the vast increase in number and diversity of communication devices, the corresponding network environment, including routers, switches, bridges, gateways, firewalls, and load balancers, has become increasingly complicated, especially with the advent of next generation (NG) (or new radio (NR)) systems.

To add further complexity to the variety of services provided by the network devices, many physical implementations of the network devices are propriety and may be unable to incorporate new or adjusted physical components to compensate for different network conditions. This has led to the development of Network Function Virtualization (NFV), which may provide a virtualized environment able to provide any network function or service able to be delivered on general purpose computing systems in a data center as software applications called Virtual Network Functions (VNFs) in conjunction with other network functions (NFs). The use of NFV may provide flexibility in configuring network elements, enabling dynamic network optimization and quicker adaptation of new technologies. As NR systems develop, the use of performance measurements of such systems continues to grow.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 5B shows NF performance measurements generation for a policy control function (PCF) in accordance with some embodiments.

FIG. 5E shows NF performance measurements generation for a Non-3GPP Interworking Function (N3IWF) in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
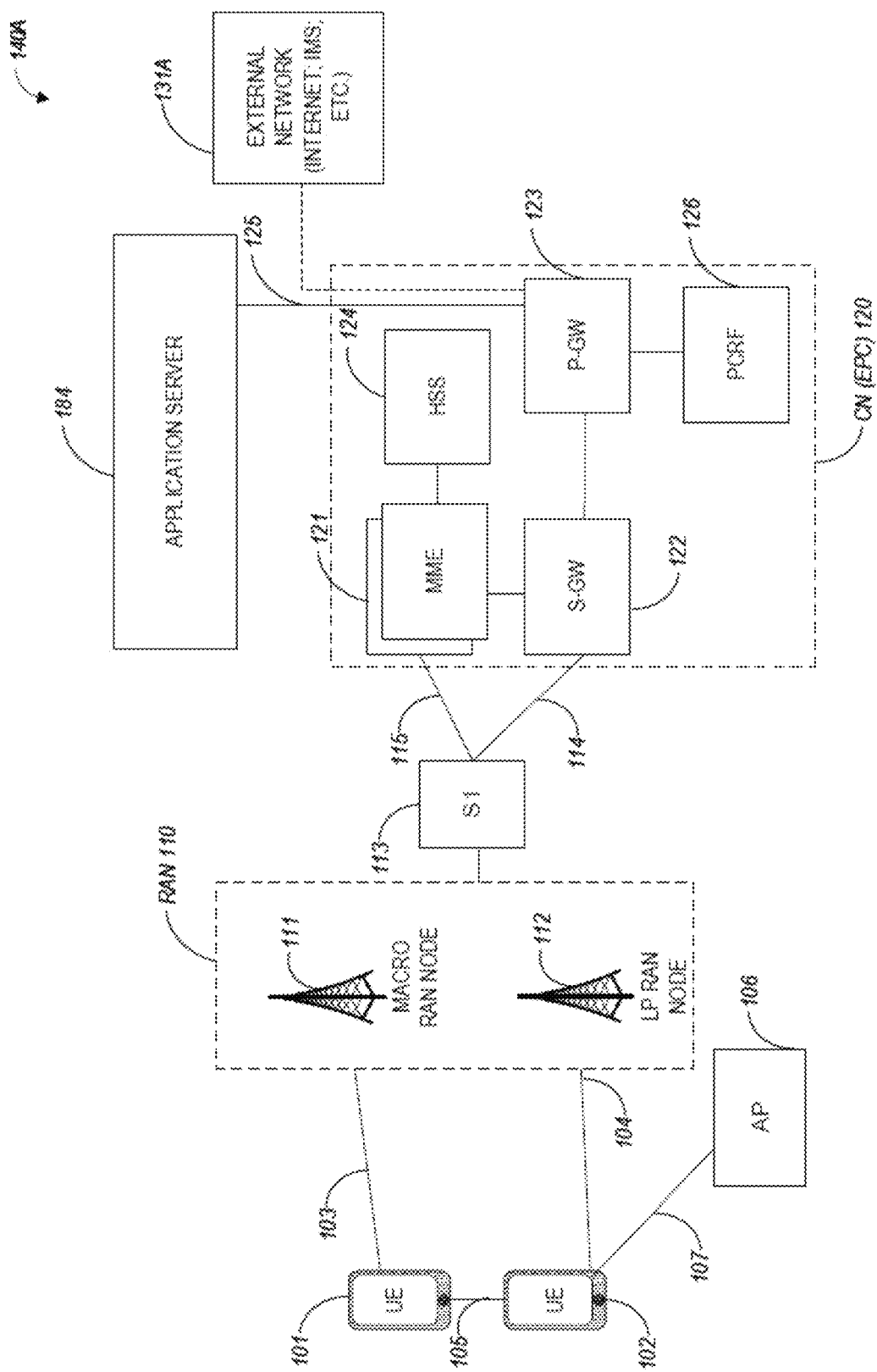
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) hut may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PIT) protocol, a PTT over Cellular (POC) protocol, a Universal Mobile Telecommunications System (UMTS) protocol, a 3GPP Long Term Evolution (le) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (MN). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a, home eNB, and so forth. In some aspects, a gNB can be a master node (MN) and NG-eNB can be a secondary node (SN) in a 5G architecture.

Figure 1B:
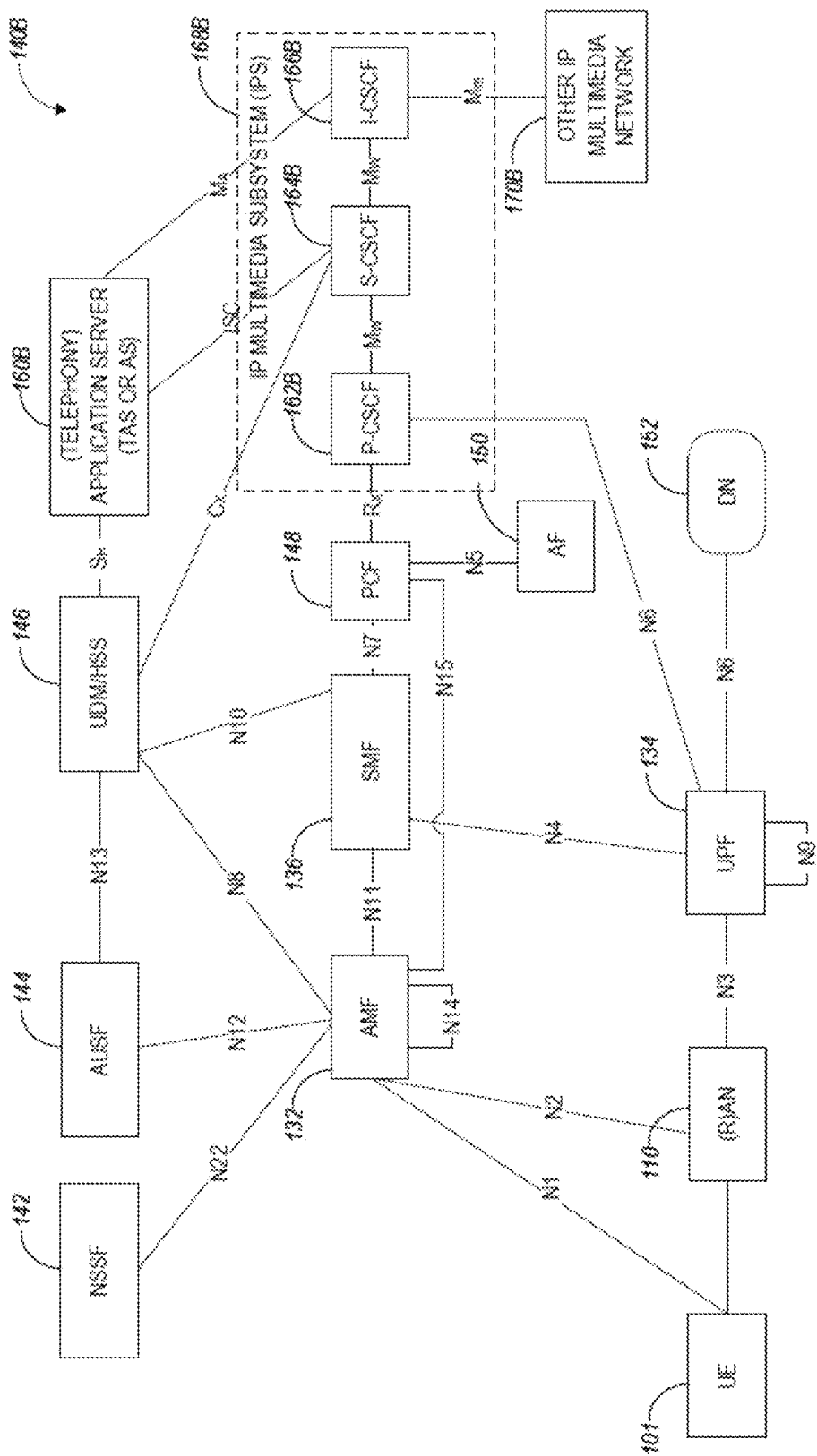
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/hone subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 151), not shown), N6 (between the UPF 134 and the DN 152). N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
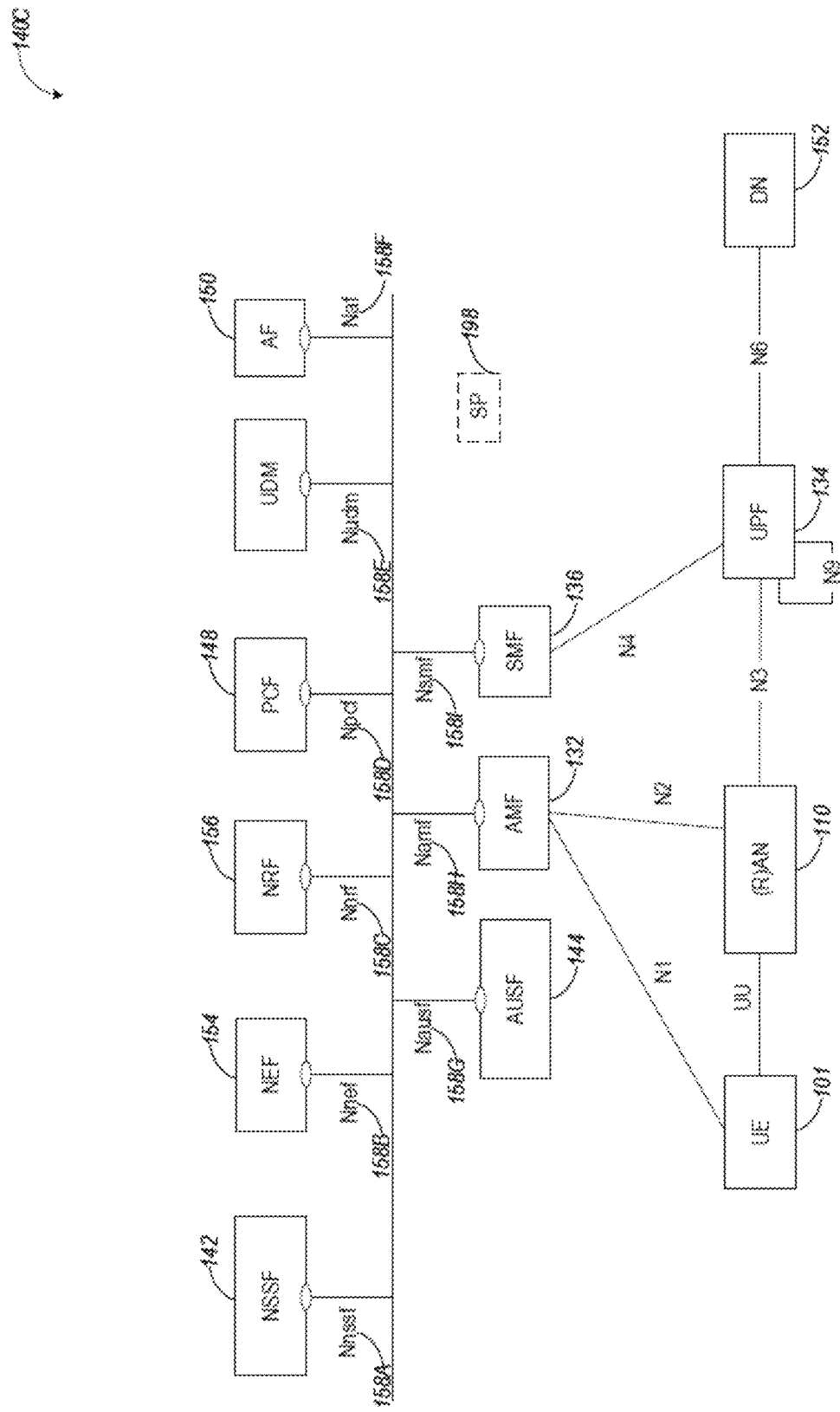
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudtn 158E (a service-based interface exhibited by the UDM 146), Naf 158F (a service-based interface exhibited by the AF 150), Nnrf 158O (a service-based interface exhibited by the NRF 156), Nnssf 158A (a service-based interface exhibited by the NSSF 142), Nausf 158G (a service-based interface exhibited by the AUSF 144. Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
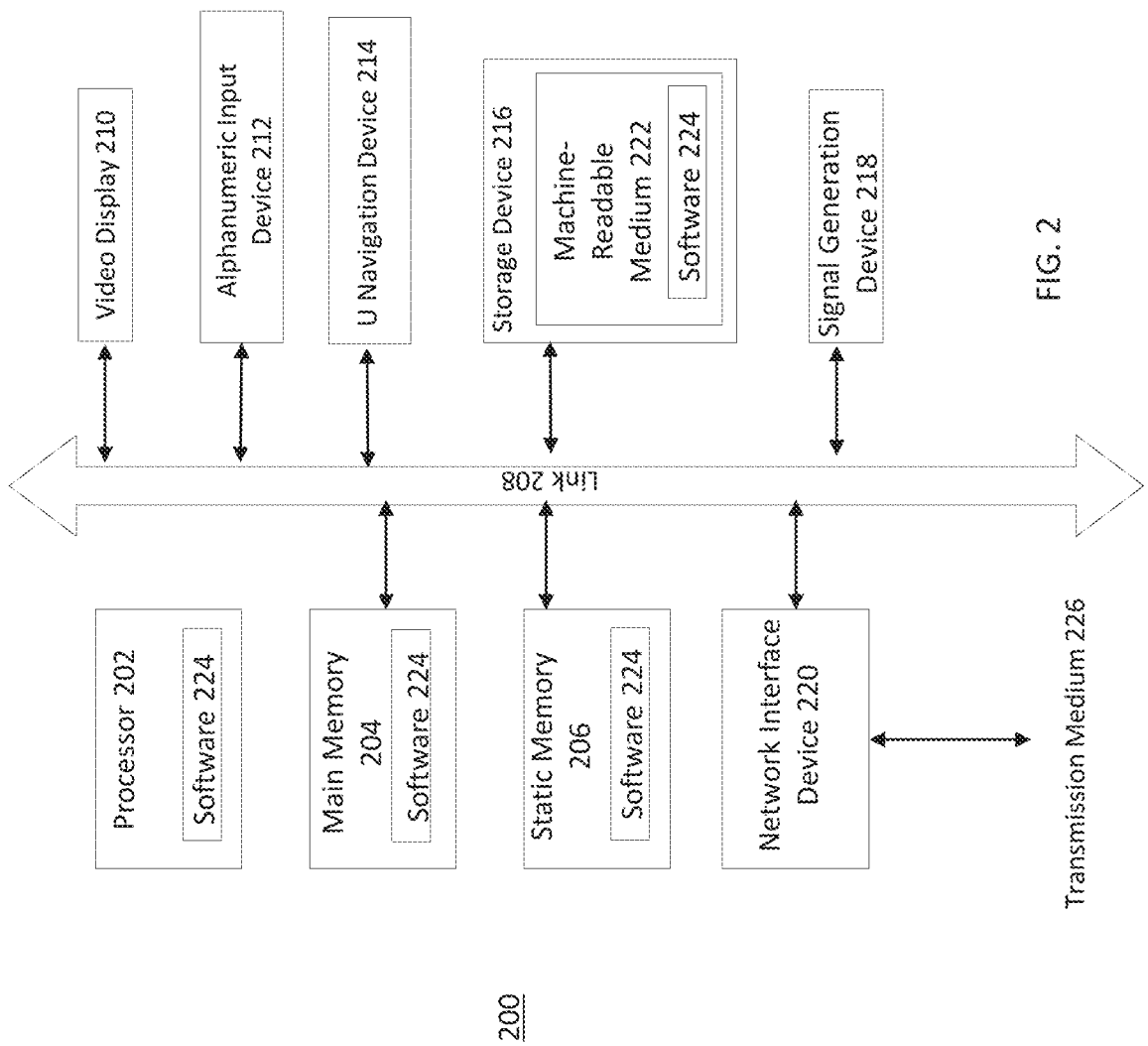
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g. a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more base band processors, a physical central processing unit (CPU), a single- or multi-core processor, and/or any other device capable of executing or otherwise operating computer-executable instructions, such as program code, software modules, and/or functional processes.

Figure 3:
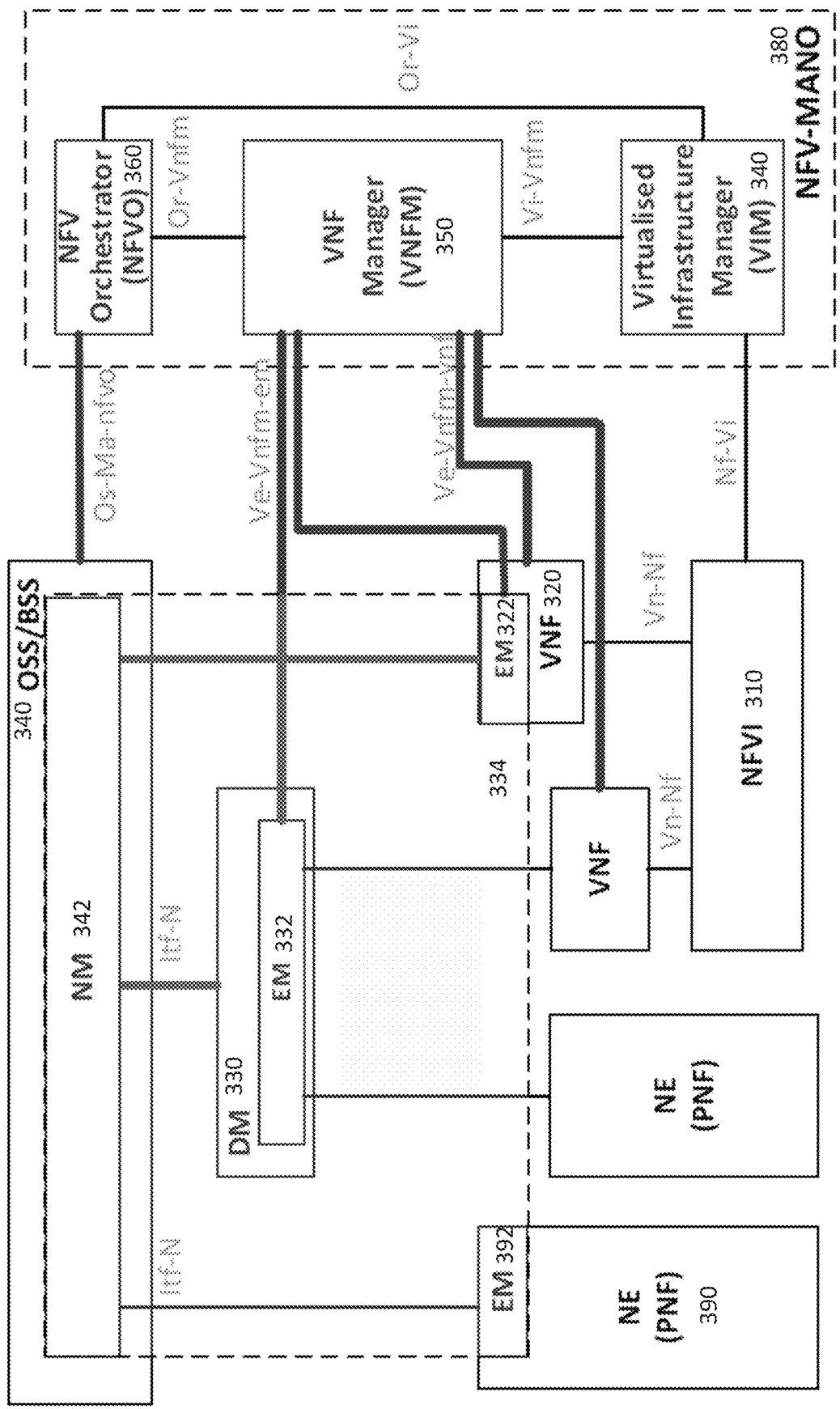
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and or virtualized components), including a Network Virtualization Function Infrastructure (NVFI) 310, Network elements (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANO, may comprise a Virtualized Infrastructure Manager (VIM) 340, a VNF Manager (VNFM) 350, and a Network Function Virtualization Orchestrator (NFVO) 360, The NM 342 may be contained in an Operations Support System/Business Support System (OSS/BSS) 340, with the DM 330 and NM 342 forming the 3GPP management system 334.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may have access to various data repositories including network services, VNFs available. NFV instances and NFVI resources with which to determine resource allocation.

The VIM 340 may control and manage the NFVI resources via Nf-Vi reference points within the infrastructure sub-domain. The VIM 340 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NEVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VIM 320 and the EMs and NMs. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VIM 370 may be specialized in handling a certain type of NFVI resource (e.g. compute-only, storage-only, networking-only), or may be capable of managing multiple types of NFVI resources. The VIM 340 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 320 of the same type or of different types. Thus, although only one VNFM 350 is shown in FIG. 3, different VNFMs 350 may be associated with the different VNFs 320 for performance measurement and other responsibilities. The VNFM 350 may provide a number of VNF functionalities, including instantiation and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The NVFI 310 may itself contain various virtualized and non-virtualized resources. These may include a plurality of virtual machines (VMs) that may provide computational abilities (CPU), one or more memories that may provide storage at either block or file-system level and one or more networking elements that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a subnetwork, which may include relations between the network elements. For example, the FM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NF 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 340, an Or-VNFM between the NFVO 360 and the VNFM 350, an Or-Vi between the NFVO 360 and the VIM 340, and a Vi-VNFM between the VIM 340 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

As above, with the advent of 5G networks and disparate devices (such as Machine Type Communication (MTC), enhanced Mobile Broadband (eMBB) and Ultra-Reliable and Low Latency Communications (URLLC) devices) using these networks, network management and network slicing is evolving towards a service based architecture in which virtualization is used. Network slicing is a form of virtualization that allows multiple virtual networks to run on top of a common shared physical network infrastructure. Network slicing serves service requirements by providing isolation between network resources, as well as permitting an optimized topology and specific configuration to be developed for each network slice. The different parts of an network slice may be grouped as Network Slice Subnets that allow the lifecycle of a Network Slice Subnet to be managed independently from the lifecycle of an network slice.

The raw performance measurement data (or raw performance measurements) of NFs of a mobile network can be analyzed, alone or together with other management data (e.g., alarm information, configuration data, etc.), and formed into one or more management analytical data for NFs, sub-networks, NSSIs or NSIs. The management analytical data can be used to diagnose ongoing issues impacting the performance of the mobile network and predict any potential issues (e.g., potential failure and/or performance degradation). For example, the analysis of NF, network slice or network slice subnet resource usage can form a management analytics data indicating whether a certain resource is deteriorating. The analysis and correlation of the overall performance data of mobile network may indicate overload situation and potential failure(s).

Figure 4:
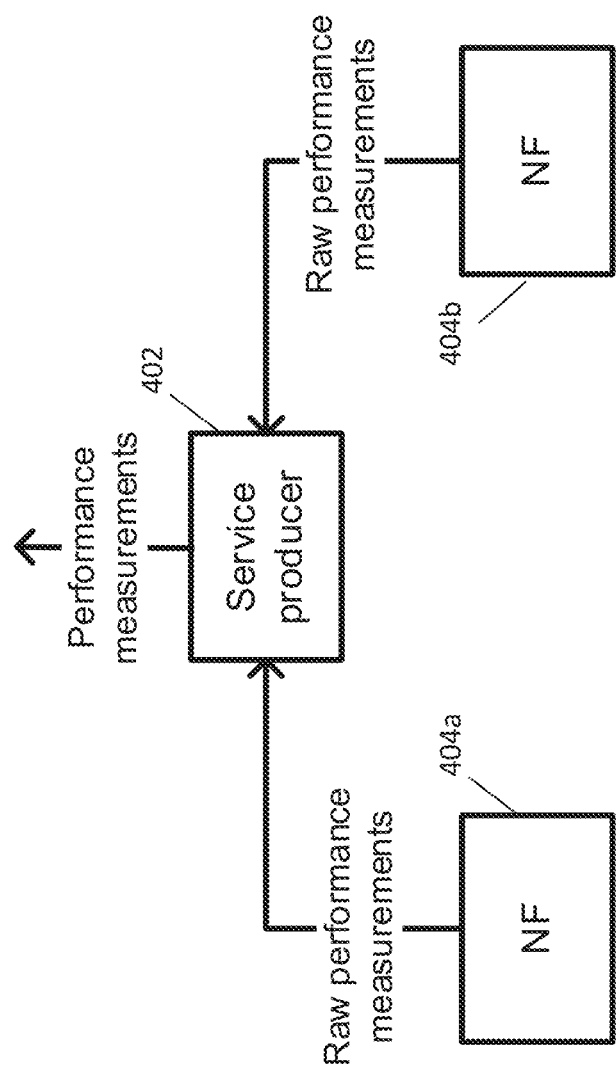
FIG. 4 illustrates an example of NF performance measurements generation in accordance with some embodiments.

FIG. 4 shows an example of NF performance measurements generation in accordance with some embodiments. In FIG. 4, a service producer 402 collects raw performance measurements from one or more NFs 404a, 404b, and generates the performance measurements (or performance indicators) for the one or more NFs 404a, 404b, which are then provided to service consumers. The one or more NFs 404a, 404b may be part of a group of NFs or an NF Set. The performance measurements may be used to generate or derive performance data, which may be referred to as "performance indicators." The performance indicators (PIs) may be aggregated over the group of NFs and derived from the performance measurements from the NFs 404a, 4104b according to an aggregation method identified in a PI definition.

The PIs are the performance data aggregated over a group of NFs. PIs include, for example, average latency along the NSI. The PIs can be derived from the performance measurements collected at the NFs that belong to the group. The aggregation method is identified in the PI definition. PIs at the NSSI level can be derived from the performance measurements collected at the NFs that belong to the NSSI or to the constituent NSSIs. The PIs at the NSSI level can be made available via the corresponding performance management service for NSSI. The PIs at the NSI level, can be derived from the NSSI level PIs collected at the constituent NSSIs and/or NFs. The NSI level PIs can be made available via the corresponding performance management service for NSI.

FIGS. 5A-5E show examples of NF performance measurements generation in accordance with some embodiments. Specifically, in FIG. 5A the service producer collects raw performance measurements from one or more NG-RAN NFs and generates the performance measurements (or performance indicators) for the one or more NG-RAN NFs, which are then provided to service consumers. In some embodiments, the service producer may be implemented in the NG-RAN, while in other embodiments the service producer may be implemented in a separate management system from each of the NG-RANs. The NG-RAN may be a gNB central unit control plane (gNB-CU-CP) and/or gNB-CU-User Plane (gNB-CU-UP).

Specifically, in FIG. 5B the service producer collects raw performance measurements from one or more PCF NFs and generates the performance measurements (or performance indicators) for the one or more NG-PCF NFs, which are then provided to service consumers. In some embodiments, the service producer may be implemented in the PCF, while in other embodiments the service producer may be implemented in a separate management system from each of the PCFs.

Figure 5A:
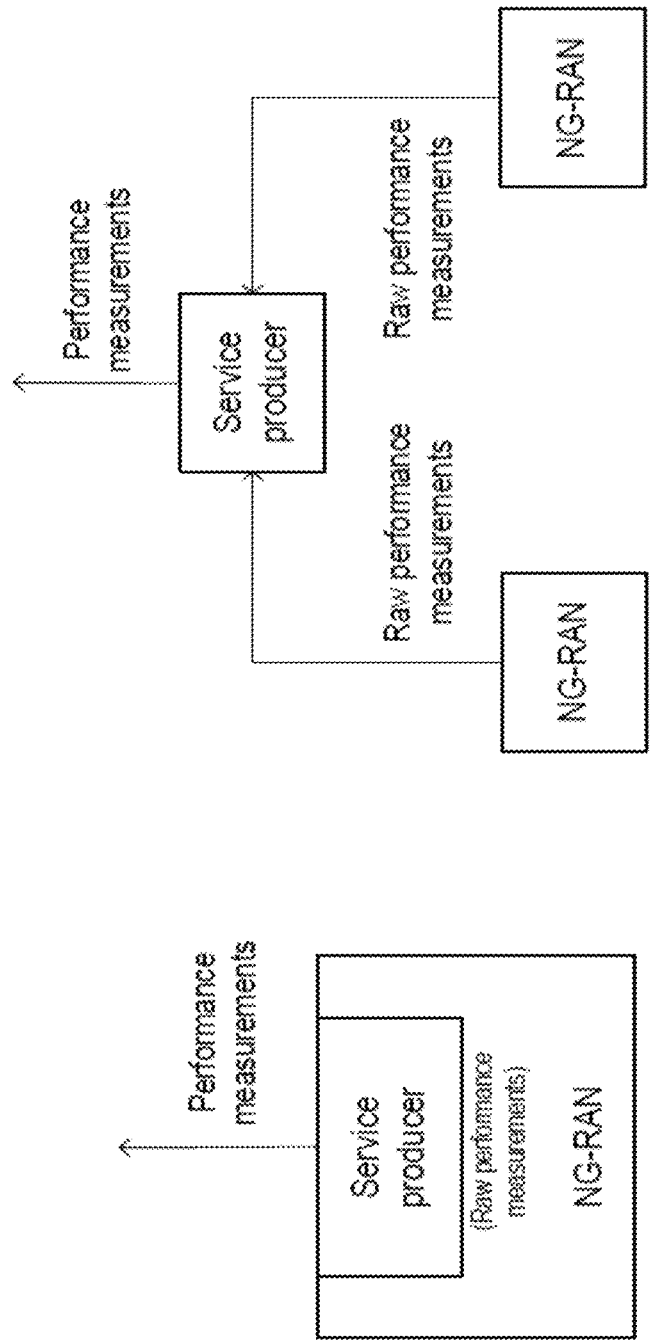
FIG. 5A shows NF performance measurements generation for a next generation random access network (NG-RAN) in accordance with some embodiments.
Figure 5C:
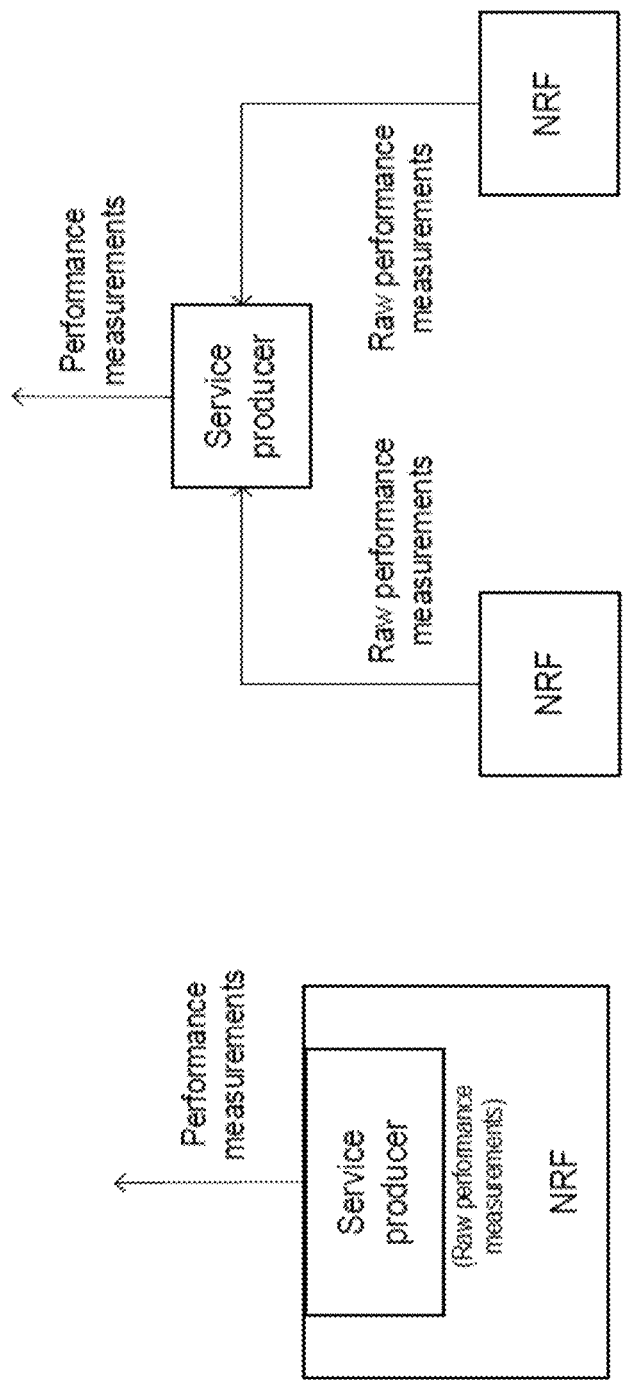
FIG. 5C shows NF performance measurements generation for an NF repository function (NRF) in accordance with some embodiments.

Specifically, in FIG. 5C the service producer collects raw performance measurements from one or more NF repository functions (NRFs) and generates the performance measurements (or performance indicators) for the one or more NRFs, which are then provided to service consumers. In some embodiments, the service producer may be implemented in the NRF, while in other embodiments the service producer may be implemented in a separate management system from each of the NRFs.

Figure 5D:
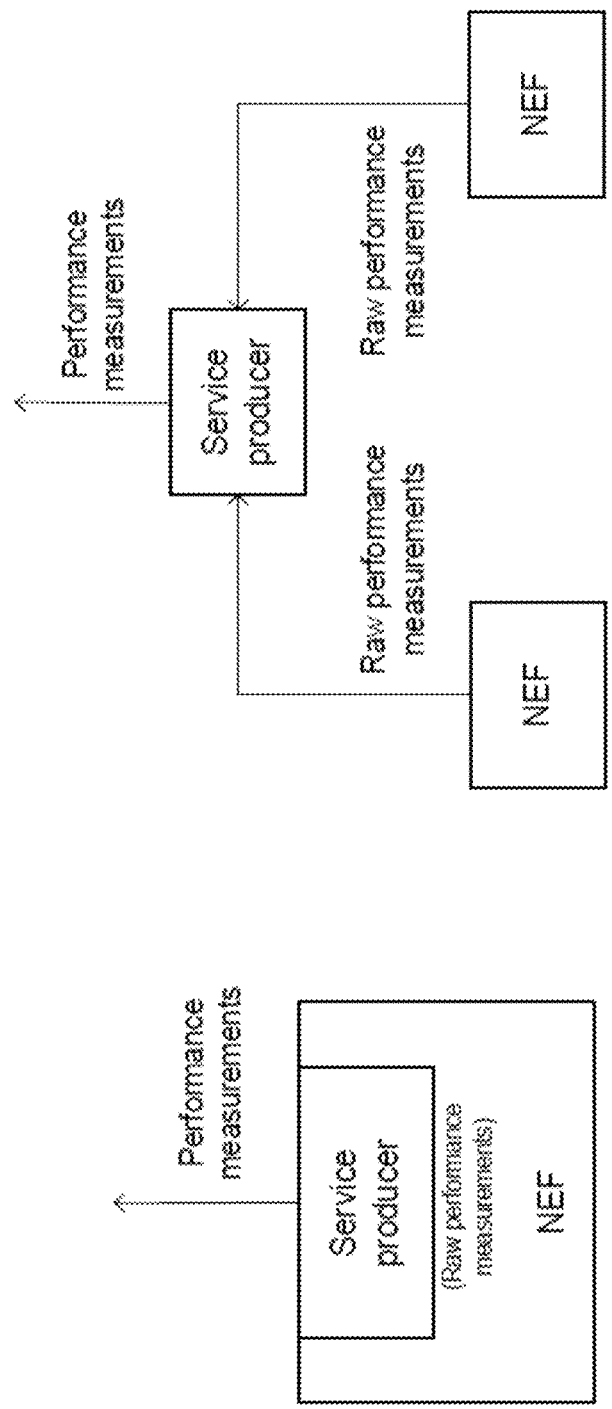
FIG. 5D shows NF performance measurements generation for a network exposure function (NEF) in accordance with some embodiments.

Specifically, in FIG. 5D the service producer collects raw performance measurements from one or more NEFs and generates the performance measurements (or performance indicators) for the one or more NEFs, which are then provided to service consumers. In some embodiments, the service producer may be implemented in the NEF, while in other embodiments the service producer may be implemented in a separate management system from each of the NEFs.

Specifically, in FIG. 5E the service producer collects raw performance measurements from one or more Non-3GPP Interworking Function (N3IWFs) and generates the performance measurements (or performance indicators) for the one or more N3IWFs, which are then provided to service consumers. In some embodiments, the service producer may be implemented in the N3IWF, while in other embodiments the service producer may be implemented in a separate management system from each of the N3IWFs. In other embodiments, the NF may be a portion of a N3IWF.

In some embodiments, each NF instance informs an NRF of the list of NF services that the NF instance supports, and the NRF maintains the information of available NF instances and their supported services. In some cases, a failed NF service registration or update would result in that 1) the NF service cannot be discovered or consumed by the consumer, and 2) the NF service may not be able to receive the notifications for the other NF services the NF service is to consume, such failures would impact users to be supported by the NF services. Therefore, it is desirable for the performance of the NF service registration or update to be monitored, especially for the failure cases which trigger trouble shooting.

An NF service is one type of capability exposed by an NF (NF Service Producer) to other authorized NF (NF Service Consumer) through a service-based interface. An NF may expose one or more NF services. The NF discovery and NF service discovery enable Core Network entities (NFs or Service Communication Proxy (SCP)) to discover a set of NF instance(s) and NF service instance(s) for a specific NF service or an NF type. Unless the expected NF and NF service information is locally configured on the requester NF, e.g., when the expected NF service or NF is in the same PLMN as the requester NF, the NF and NF service discovery is implemented via the NRF.

If the NF service instance(s) cannot be discovered by the NF consumer, the network feature may not be fully supported; the use of the NF service instance(s) may suffer from service failures. Therefore, it is desirable to monitor the performance of the NF service discovery.

In some embodiments, the UE policy (such as the UE Route Selection Policy (URSP) and Access network discovery and selection policy (ANDSP)) association may be established such as in the following scenario: the UE initial registration with the network when a UE Policy Container is received; AMF relocation with PCF change in handover procedure and registration procedure occurs; and UE registration with the 5GS when the UE moves from the Evolved Packet System (EPS) to the 5GS and there is no existing UE Policy Association between the AMF and PCF for this UE.

The UE policy association establishment allows the UE to be served by the 5GS under the designed policies, and therefore should be monitored. How ever, in previous systems, the measurements associated with this are missing.

The Packet Flow Description (PFD) describes the packet flow for the UL/DL application traffic by a tuple of protocol, server-side IP and port number. Management of Packet Flow Descriptions (PFDs) refers to the capability to create, update or delete PFDs in the NEF (PFDF) for the applications under the request of AF, and the distribution from the NEF (PFDF) to the SMF and finally to the UPF. The 5G network should have up-to-date PFDs in order to deliver user data to the destination for the applications, and the applications may be unable to be fulfilled without PFDs or with wrong or obsolete PFDs. Therefore, it is desirable to monitor the performance of PFD management, including PFD creation, update, deletion, fetch and subscription.

The QoS flow established untrusted non-3GPP access may be released for normal or abnormal reasons. A normal QoS flow release allows relocation of the limited resource in the RAN to other services. An abnormal QoS flow release (i.e., the flow is released when active) directly impacts the ongoing service of UEs. Therefore, it is desirable to monitor the performance of QoS flow release via untrusted non-3GPP access.

The handover parameters setting may be specific for each neighbor cell relation (NCR), and the handover performance may vary significantly tier different NCRs. Thus it is desirable to measure the performance per NCR to support handover parameters optimization when desirable.

The various embodiments herein thus relate to generating performance measurements related to NF service management, PFD management, UE policy association, QoS flow release and handovers.

Performance Measurements

To define the following performance measurements to TS 28.552 (herein incorporated by reference in its entirety) based on the template in 32.404. The template includes:
a) Description: contains an explanation of the measurement operation.
b) Collection Method: contains the form in which measurement data is obtained:
  CC (Cumulative Counter);
  GAUGE (dynamic variable), used when data being measured can vary up or down during the period of measurement;
  DER (Discrete Event Registration), when data related to a particular event are captured every $n^{th}$ event is registered, where n can be 1 or larger;
  SI (Status Inspection);
  TF (Transparent Forwarding);
  OM (Object Mapping).
c) Condition: contains the condition which causes the measurement result data to be updated
  This will be defined by identifying protocol related trigger events for starting and stopping measurement processes, or updating the current measurement result value. Where it is not possible to give a precise condition, then the conditional circumstances leading to the update are stated.
  If a measurement is not available for FDD or TDD, then the measurement description shall contain a statement.
  If a measurement is related to "external" technologies, this subclause shall give a brief reference to other standard bodies.
d) Measurement Result (Measured Value(s), Units)
  This subclause contains a description of expected result value(s) (e.g. a single integer value). If a measurement is related to "external" technologies, this subclause shall also give a brief reference to other standard bodies.
  The definition apples for each measurement result.
e) Measurement Type: contains a short form of the measurement name specified in the header, which is used to identify the measurement type in the result files
  The measurement names are dotted sequences of items. The sequence of elements identifying a measurement is organized from the general to the particular.
  The first item identifies the measurement family (e.g. HHO, RAB, SMS). Note that this family may also be used for measurement administration purpose.
  The second item identities the name of the measurement itself, for which the following rules apply:
    The second item of the measurement name can be divided into <Operation>, <Reason/Result> and <Direction> (and in that order)
    Examples of Operation can be Establishment, Release, and Modification
    Examples of Reason/Result can be Attempt, Failure, Success, Throughput and Volume
    Examples of Direction can be Incoming, Outgoing, Uplink and Downlink
  Depending on the measurement type, additional items may be present to specify subcounters (failure causes, traffic classes, min, max, avg, G, U . . . ). In case of multiple additional items, they are also represented as a dotted sequence of items. When available, the template will describe to which standard it is referring to for these additional items (e.g. cause, traffic class). Otherwise, the additional item semantics must be described in details in the present document.
  Standardised causes will be a number. This number shall be derived according to which of the following rules apples:
  For the standardised causes with numeric values explicitly specified in the reference specification, the subcounter name will be the number assigned to this cause in this reference specification.
  For the standardised causes without numeric values explicitly specified in the reference specification, but where the causes are identified, the subcounter name shall be an number from 1 to n mapped in an incremental sequence to each of the specified causes following top down sequence in the order they are identified in the reference specification (e.g. RR.C.ConnEstab.1, 1 identifies the establishment cause "Originating Conversational Call", see TS 25.331),
  For the standardised causes without numeric values explicitly specified in the reference specification and the causes identified and the causes have been divided into different cause groups, the subcounter should be defined as the form of 'Cause group'.Cause, where:

the subcounter name of 'Cause group' shall be an incremental number from 1 to n to identify each cause group specified in a lop down sequence following the order they are identified in the reference specification, the subcounter name of cause within this cause group shall be an incremental number from 1 to n to identify each cause within the group specified in a top down sequence following the order they are identified within the cause group in the reference specification (e.g. RLM.FailRLSetupIub.2.1, 2.1 indenfies the cause "Transport resource unavailable" in the cause group "Transport Layer Cause", see TS 25.433) Subcounter 'Cause group'.sum is permitted to identify the aggregate of measurement values of all the causes within the cause group (e.g. RLM.FailRLSetupIub.1.sum, 1.sum identifies the aggregate of all the causes within the cause group "Radio Network Layer Cause", see TS 25.433).

The non standardised causes should be a string (e.g. RRC.ConnEstab.NoReply).

The set of values issued for a measurement does not depend on the associated collection method (CC, SI, Gauge, DER, TF). For instance, a gauge collected counter does not necessarily provide min, max, average values.

The vendor-specific UMTS and combined GSM/UMTS measurement names will all begin with the VS prefix.

In addition, it is recommended that a prefix is added for non-UMTS measurements:
Q3 for Q3 measurements:
MIB for IETF measurements (ATM, IP):
OS for other standards measurements.

The 3GPP standardised measurements name must not commence with the above prefixes.

Examples of valid measurement names are:
HO PrepAtt
SAEB EstabSucc
RRC.ConnEstabAtt.Cause
where Cause identifies the failure cause.

Examples of valid measurement names for measurements defined before version 8.3.0 of the present document are:
VS HO InterSGSNReject.NoResource;
ATM. ATMLIngressCells;
HHO.SuccOutIntraCell;
MM.AttachedSubs.Max,
RAB.EstabAttCS.Conversational;
RRC.ConnEstab.Cause
where Cause identifies the failure cause.

Abbreviations to be used within measurement types can be found in subclause 3.2 of the present document.

f) Measurement Object Class: describes the measured object class (e.g. UtranCell, RncFunction, SgsnFunction)

The object class used for this purpose shall be in accordance with NRMs defined in any NRM IRPs, such as those defined in 3GPP TS 32,622 [9], TS 32.632 [7], TS 32.642 [8], TS 28.541 [24] and TS 28.543 [25].

For object classes currently not defined according to the above, the present document defines its own nomenclature (e.g. RA, LAC).

It is possible to use the same measurement name for a standardized measurement type implemented at a different object class level than the one defined in the Standard. The same measurement type can apply to one or more measurements for which all fields of the measurement template are the same except the clause 0 "Measurement Object Class". For instance, a measurement which uses the same template as a given measurement type but relates to another or different object classes (e.g. UtranCell instead of UtranRelation, or RncFunction and UtranCell) shall have the same name.

g) Switching Technology: contains the Switching domain(s) this measurement is applicable to i.e. Circuit Switched and/or Packet Switched h) Generation: determines if it concerns a GSM, UMTS, EPS, 5GS, combined (GSM+UMTS+EPS+5GS) or IMS measurement GSM: pure GSM measurement; it only counts GSM events. In a combined (GSM+UMTS+EPS) NF the count would be exactly the same as in a pure GSM NE. In a pure UMTS, pure EPS or combined UMTS and EPS NF this counter does not exist;

UMTS: pure UMTS measurement; it only counts UMTS events. In a combined (GSM+UMTS+EPS) NF the count would be exactly the same as in a pure UMTS NE. In a pure GSM, pure EPS or combined GSM and EPS NE this counter does not exist;

EPS: pure EPS measurement; it only counts EPS events. In a combined (GSM+UMTS+EPS) NF the count would be exactly the same as in a pure EPS NE. In a pure GSM, pure UTMS or combined GSM and UTMS NF this counter does not exist;

5GS: pure 5GS measurement; it only counts 5GS events. In a combined (GSM+UMTS+EPS+5GS) NE, the count would be exactly the same as in a pure 5GS NE. In a pure GSM, pure UTMS, pure EPS or combined GSM, UTMS and EPS NE this counter does not exist;

GSM/UMTS: measurement applicable to both GSM and UMTS systems; in a combined (GSM+UMTS) NF separate subcounts for GSM and/or UMTS events can be obtained;

GSM/UMTS/EPS: measurement applicable to GSM, UMTS and EPS systems; in a combined (GSM+UMTS+EPS) NF separate subcounts for GSM, and/or UMTS, and/or EPS events can be obtained;

EPS/5GS: measurement applicable to EPS and 5GS systems; in a combined (EPS+5GS) NF separate subcounts for EPS, and/or 5GS events can be obtained;

Combined: measurement applicable to combined GSM, UMTS, EPS and 5GS systems, but regardless of whether the measured event occurred on the GSM, UMTS, EPS or 5GS part of the system. This means that in a combined NF only one total (i.e. GSM+UMTS+EPS+5GS) count is obtained for the measured event.

The above aspects are also reflected in the measurement type name in template item E by adding a "G" to the GSM measurements, "U" to the UMTS measurements, "E" to the EPS measurements. "5G" for 5GS measurements.

IMS: measurement applicable to IMS.

NOTE: The GSM component of combined GSM/ UMTS equipment may actually choose to implement GSM measurements according to the present document or TS 52.402 [2], based on GSM specifications.

i) Purpose: optional clause that describes who will be using the measurement.

It is proposed to indicate in this clause the targeted categories of users based on the measurement user communities described in Annex B of TS 32.404.

When available, this clause provides additional information on the interest of the measurement but is however purely indicative.

a) Description: contains an explanation of the measurement operation.

b) Collection Method: contains the form in which measurement data is obtained:

CC (Cumulative Counter);

GAUGE (dynamic variable), used when data being measured can vary up or down during the period of measurement;

DER (Discrete Event Registration), when data related to a particular event are captured every $n^{th}$ event is registered, where n can be 1 or larger;

SI (Status Inspection);

TF (Transparent Forwarding);

OM (Object Mapping).

c) Condition: contains the condition which causes the measurement result data to be updated This will be defined by identifying protocol related trigger events for starting and stopping measurement processes, or updating the current measurement result value. Where it is not possible to give a precise condition, then the conditional circumstances leading to the update are stated.

If a measurement is not available for FDD or TDD, then the measurement description shall contain a statement.

If a measurement is related to "external" technologies, this subclause shall give a brief reference to other standard bodies.

d) Measurement Result (measured value(s), Units)

This subclause contains a description of expected result value(s) (e.g. a single integer value). If a measurement is related to "external" technologies, this subclause shall also give a brief reference to other standard bodies.

The definition apples for each measurement result.

e) Measurement Type: contains a short form of the measurement name specified in the header, which is used to identify the measurement type in the result files The measurement names are dotted sequences of items.

The sequence of elements identifying a measurement is organised from the general to the particular.

The first item identifies the measurement family (e.g. RATS, SMS). Note that this family may also be used for measurement administration purpose.

The second item identifies the name of the measurement itself, fix which the following rules apply:

The second item of the measurement name can be divided into <Operation>, <Reason/Result> and <Direction> (and in that order)

Examples of Operation can be Establishment, Release, and Modification

Examples of Reason/Result can be Attempt, Failure, Success, Throughput and Volume Examples of Direction can be Incoming, Outgoing, Uplink and Downlink Depending on the measurement type, additional items may be present to specify subcounters (failure causes, traffic classes, min, max, avg, G, U . . . ). In case of multiple additional items, they are also represented as a dotted sequence of items. When available, the template will describe to which standard it is referring to for these additional items (e.g. cause, traffic class). Otherwise, the additional item semantics must be described in details in the present document.

Standardised causes will be a number. This number shall be derived according to which of the following rules applies:

For the standardised causes with numeric values explicitly specified in the reference specification, the subcounter name will be the number assigned to this cause in this reference specification.

For the standardised causes without numeric values explicitly specified in the reference specification, but where the causes are identified, the subcounter name shall be an number from 1 to n mapped in an incremental sequence to each of the specified causes following top down sequence in the order they are identified in the reference specification (e.g. RRC.ConnEstab.1, 1 identifies the establishment cause "Originating Conversational Call", see TS 25.331):

For the standardised causes without numeric values explicitly specified in the reference specification and the causes identified and the causes have been divided into different cause groups, the subcounter should be defined as the form of 'Cause group'.Cause, where:

the subcounter name of 'Cause group' shall be an incremental number from 1 to n to identify each cause group specified in a top down sequence following the order they are identified in the reference specification, the subcounter name of cause within this cause group shall be an incremental number from 1 to n to identify each cause within the group specified in a top down sequence following the order they are identified within the cause group in the reference specification (e.g. RLM.FailRLSetupIub.2.1, 2.1 indenfies the cause "Transport resource unavailable" in the cause group "Transport Layer Cause", see TS 25.433). Subcounter 'Cause group'.sum is permitted to identify the aggregate of measurement values of all the causes within the cause group (e.g. RLM.FailRLSetupIub.1.sum, 1.sum identifies the aggregate of all the causes within the cause group "Radio Network Layer Cause", see TS 25.433).

The non standardised causes should be a string (e.g. RRC.ConnEstab.NoReply).

The set of values issued for a measurement does not depend on the associated collection method (CC, SI, Gauge, DER, TF). For instance, a gauge collected counter does not necessarily provide min, max, average values.

The vendor-specific UMTS and combined GSM/ UMTS measurement names will all begin with the VS prefix.

In addition, it is recommended that a prefix is added for non-UMTS measurements:
Q3 for Q3 measurements;
MIB for IETF measurements (ATM, IP);
OS for other standards measurements.
The 3GPP standardised measurements name must not commence with the above prefixes,
Examples of valid measurement names are:
HO.PrepAtt
SAEB.EstabSucc
RRC.ConnEstabAtt. Cause
where Cause identifies the failure cause.
Examples of valid measurement names for measurements defined before version 8.3.0 of the present document are:
VS.HO.InterSGSNReject.NoResource;
ATM.ATML.IngressCells;
HHO.SuccOutIntraCell;
MM.AttachedSubs.Max;
RAB.EstabAttCS.Conversational;
RRC.ConnEstab.Cause
where Cause identifies the failure cause.
Abbreviations to be used within measurement types can be found in subclause 3.2 of the present document.
f) Measurement Object Class: describes the measured object class (e.g. UtranCell, RncFunction, SgsnFunction)
The object class used for this purpose shall be in accordance with NRMs defined in any NRM IRPs, such as those defined in 3GPP TS 32.622 [9], TS 32.632 [7], TS 32,642 [8], TS 28.541 [24] and TS 28.543 [25].
For object classes currently not defined according to the above, the present document defines its own nomenclature (e.g. RA, LAC).
It is possible to use the same measurement name for a standardized measurement type implemented at a different object class level than the one defined in the Standard. The same measurement type can apply to one or more measurements for which all fields of the measurement template are the same except the clause f) "Measurement Object Class". For instance, a measurement which uses the same template as a given measurement type but relates to another or different object classes (e.g. UtranCell instead of UtranRelation, or RncFunction and UtranCell) shall have the same name.
g) Switching Technology: contains the Switching domain (s) this measurement is applicable to i.e. Circuit Switched and/or Packet Switched
h) Generation: determines if it concerns a GSM, UMTS, EPS, 5GS, combined (GSM+UMTS+EPS+5GS) or IMS measurement
GSM: pure GSM measurement; it only counts GSM events. In a combined (GSM+UMTS+EPS) NF the count would be exactly the same as in a pure GSM NE. In a pure UMTS, pure EPS or combined UMTS and EPS NF this counter does not exist;
UMTS: pure UMTS measurement; it only counts UMTS events. In a combined (GSM+UMTS+EPS) NF the count would be exactly the same as in a pure UMTS NE. In a pure GSM, pure EPS or combined GSM and EPS NF this counter does not exist;
EPS: pure EPS measurement; it only counts EPS events. In a combined (GSM+UMTS+EPS) NF the count would be exactly the same as in a pure EPS NE. In a pure GSM, pure UTMS or combined GSM and UTMS NF this counter does not exist;
5GS: pure 5GS measurement; it only counts 5GS events. In a combined (GSM+UMTS+EPS+5GS) NF the count would be exactly the same as in a pure 5GS NE. In a pure GSM, pure UTMS, pure EPS or combined GSM, UTMS and EPS NF this counter does not exist;
GSM/UMTS: measurement applicable to both GSM and UMTS systems; in a combined (GSM+UMTS) NF separate subcounts for GSM and/or UMTS events can be obtained;
GSM/UMTS/EPS: measurement applicable to GSM, UMTS and EPS systems; in a combined (GSM+ UMTS+EPS) NF separate subcounts for GSM, and/or UMTS, and/or EPS events can be obtained;
EPS/5GS: measurement applicable to EPS and 5GS systems; in a combined (EPS+5GS) NF separate subcounts for EPS, and/or 5GS events can be obtained;
Combined: measurement applicable to combined GSM, UMTS, EPS and 5GS systems, but regardless of Whether the measured event occurred on the GSM, UMTS, EPS or 5GS part of the system. This means that in a combined NF only one total (i.e. GSM+UMTS+EPS+5GS) count is obtained for the measured event.
The above aspects are also reflected in the measurement type name in template item E by adding a "G" to the GSM measurements, "U" to the UMTS measurements, "E" to the EPS measurements. "5G" for 5GS measurements.
IMS: measurement applicable to IMS.
NOTE: The GSM component of combined GSM/UMTS equipment may actually choose to implement GSM measurements according to the present document or TS 52.402 [2], based on GSM specifications.
1) Purpose: optional clause that describes who will be using the measurement.
It is proposed to indicate in this clause the targeted categories of users based on the measurement user communities described in Annex B of TS 32.404.
When available, this clause provides additional information on the interest of the measurement but is however purely indicative.
The performance measurements described based on the above format are:
5.x Performance Measurements for NRF
5.x.1 NF Service Registration Related Measurements
5.x.1.1 Number of NF Service Registration Requests
a) This measurement provides the number of NF service registration requests received at the NRF.
b) CC.
c) Receipt by the NRF of an Nnrf_NFManagement_N-FRegister Request message.
d) A single integer value.
e) NFS.RegReq
f) NRFFunction.
g) Valid for packet switched traffic.
h) 5GS.
5.x.1.2 Number of Successful NF Service Registrations
a) This measurement provides the timber of successful NF service registrations at the NRF.
b) CC.
c) Transmission by the NRF of an Nnrf_NFManagement_NFRegister Response message indicating a successful NF service registration.

d) A single integer value.
e) NFS.RegSucc
f) NRFFunction.
g) Valid for packet switched traffic.
h) 5GS.

5.x.1.3 Number of Failed NF Service Registrations Due to Encoding Error of NF Profile
a) This measurement provides the number of failed NF service registrations at the NRF due to encoding error of the received NF profile,
b) CC.
c) Transmission by the NRF of an Nnrf_NFManagement_NFRegister Response message indicating a failed NF service registration due to encoding error of NF profile.
d) A single integer value.
e) NFS.RegFailEncodeErr
f) NRFFunction.
g) Valid for packet switched traffic.
h) 5GS.

5.x.1.4 Number of Failed NF Service Registrations Due to NRF Internal Error
a) This measurement provides the number of failed NF service registrations at the NRF due to NRF internal error.
b) CC.
c) Transmission by the NRF of an Nnrf_NFManagement_NFRegister Response message indicating a failed NF service registration due to NRF internal error.
d) A single integer value.
e) NFS.RegFailNrfErr
f) NRFFunction.
g) Valid for packet switched traffic.
h) 5GS.

5.x.2 NF Service Update Related Measurements
5.x.2.1 Number of NF service Update Requests
a) This measurement provides the number of NF service update requests received at the NRF.
b) CC.
c) Receipt by the NRF of an Nnrf_NFManagement_NFUpdate Request message.
d) A single integer value.
e) NFS.UpdateReq
f) NRFFunction.
g) Valid for packet switched traffic.
h) 5GS.

5.x.2.2 Number of Successful NF Service Updates
a) This measurement provides the number of successful NF service updates at the NRF.
b) CC.
c) Transmission by the NRF of an Nnrf_NFManagement_NFUpdate Response message indicating a successful NF service update.
d) A single integer value.
e) NFS.UpdateSucc
f) NRFFunction.
g) Valid for packet switched traffic.
h) 5GS.

5.x.2.3 Number of Failed NF Service Updates Due to Encoding Error of NF Profile
a) This measurement provides the number of failed NF service updates at the NRF due to encoding error of the received NF profile.
b) CC.
c) Transmission by the NRF of an Nnrf_NFManagement_NFUpdate Response message indicating a failed NF service update due to encoding error of NF profile.
d) A single integer value.
e) NFS.UpdateFailEncodeErr
f) NRFFunction.
g) Valid for packet switched traffic.
h) 5GS.

5.x.2.4 Number of Failed NF Service Updates Due to NRF Internal Error
a) This measurement provides the number of failed NF service updates at the NRF due to NRF internal error.
b) CC.
c) Transmission by the NRF of an Nnrf_NFManagement_NFUpdate Response message indicating a failed NF service update due to NRF internal error.
d) A single integer value.
e) NFS.UpdateFailNrfErr
f) NRFFunction.
g) Valid for packet switched, traffic.
h) 5GS.

5.x.y NF Service Discovery Related Measurements
5.x.y.1 Number of NF Service Discovery Requests
a) This measurement provides the number of NF service discovery requests received at the NRF.
b) CC.
c) Receipt by the NRF of an Nnrf_NFDiscovery_Request message.
d) A single integer value.
e) NFS.DiscReq
f) NRFFunction.
g) Valid for packet switched traffic.
h) 5GS.

5.x.y.2 Number of Successful NF Service Discoveries
a) This measurement provides the number of successful NF service discoveries at the NRF.
b) CC.
c) Transmission by the NRF of an Nnrf_NFDiscovery_Request Response message indicating a successful NF service discovery.
d) A single integer value.
e) NFS.DiscSucc
f) NRFFunction.
g) Valid for packet switched traffic.
h) 5GS.

5.x.y.3 Number of Failed NT Service Discoveries Due to Unauthorized NF Service Consumer
a) This measurement provides the number of failed NF service discoveries due to the NF consumer is not allowed to discover the NT service(s),
b) CC.
c) Transmission by the NRF of an Nnrf_NFDiscovery_Request Response message indicating a failed NF service registration due to the NF consumer is not allowed to discover the NT service(s).
d) A single integer value.
e) NTS.DiscFailUnauth
f) NRFFunction.
g) Valid for packet switched traffic.
h) 5GS.

5.x.y.4 Number of Failed NF Service Discoveries Due to Input Errors
a) This measurement provides the number of failed NF service discoveries at the NRF due to errors in the input data in the URI query parameters.
b) CC.
c) Transmission by the NRF of an Nnrf_NFDiscovery_Request Response message indicating a failed NF service registration due to errors in the input data in the URI query parameters.

d) A single integer value.
e) NFS.DiscFailInputErr
f) NRFFunction.
g) Valid for packet switched traffic.
h) 5GS.

5.x.y.5 Number of Failed NF Service Discoveries Due to NRF Internal Error
a) This measurement provides the number of failed NF service discoveries at the NRF due to NRF internal error.
b) CC.
c) Transmission by the NRF of an Nnrf_NFDiscovery_Request Response message indicating a failed. NT service discoveries due to NRF internal error.
d) A single integer value.
e) NFS.DiscFailNrfErr
f) NRFFunction.
g) Valid for packet switched traffic.
h) 5GS.

5.5.x UE Policy Association Related Measurements
5.5.x.1. Number of UE Policy Association Requests
a) This measurement provides the number of UE policy association requests received by the PCF.
b) CC
c) On receipt by the PCF from the AMF of Npcf_UEPolicyControl Create Request.
d) A single integer value
e) PA.PolicyUeAssoReq
f) PCFFunction
g) Valid for packet switched traffic
h) 5GS 5.5.x.2 Number of Successful UE Policy Associations
a) This measurement provides the number of successful UE policy associations at the PCF.
b) CC
c) On transmission by the PCF to the AMF of Npcf_UEPolicyControl Create Response indicating a successful UE policy association.
d) A single integer value
e) PA.PolicyUeAssoSucc
f) PCFFunction
g) Valid for packet switched traffic
h) 5GS 5.9.x Measurements Related to PFD Management
5.9.x.1 PFD Creation
5.9.x.1.1 Number of PFD Creation Requests
a) This measurement provides the number of PFD creation requests received by the NEF from AF.
b) CC
c) Receipt of an Nnef_PFDManagement_Create Request by the NEF from AF.
d) An integer value
e) PFD.CreateReq
f) NEFFunction
g) Valid for packet switched traffic
h) 5GS 5.9.x.1.2 Number of Successful PFD Creations
a) This measurement provides the number of successful PFD creations at NEF.
b) CC
c) Transmission of an Nnef_PFDManagement_Create Response by the NEF to AF indicating a successful PFD creation.
d) An integer value
e) PFD.CreateSucc
f) NEFFunction
g) Valid for packet switched traffic
h) 5GS 5.9.x.2 PFD Update
5.9.x.2.1 Number of PFD Update Requests
a) This measurement provides the number of PFD update requests received by the NEF from AF.
b) CC
c) Receipt of an Nnef_PFDManagement_Update Request by the NEF from AF.
d) An integer value
e) PFD.UpdateReq
f) NEFFunction
g) Valid for packet switched traffic
h) 5GS 5.9.x.2.2 Number of Successful PFD Updates
a) This measurement provides the number of successful PFD updates at NEF
b) CC
c) Transmission of an Nnef_PFDManagement_Update Response by the NEF to AF indicating a successful PFD update.
d) An integer value
e) PFD.UpdateSucc
f) NEFFunction
g) Valid for packet switched traffic
h) 5GS 5.9.x.3 PFD Deletion
5.9.x.3.1 Number of PFD Deletion Requests
a) This measurement provides the number of PFD deletion requests received by the NEF from AF.
b) CC
c) Receipt of an Nnef_PFDManagement_Delete Request by the NEF from AF.
d) An integer value
e) PFD.DeleteReq
f) NEFFunction
g) Valid for packet switched traffic
h) 5GS 5.9.x.3.2 Number of Successful RFD Deletions
a) This measurement provides the number of successful PFD deletions at NEF.
b) CC
c) Transmission of an Nnef_PFDManagement_Delete Response by the NET to AF indicating a successful PFD deletion.
d) An integer value
e) PFD.DeleteSucc
f) NEFFunction
g) Valid for packet switched traffic
h) 5GS 5.9.x.4 PFD Fetch
5.9.x.4.1 Number of PFD Fetch Requests
a) This measurement provides the number of PFD fetch requests received by the NEF from SMF.
b) CC
c) Receipt of an Nnef_PFDManagement_Fetch Request by the NEF from SMF.
d) An integer value
e) PFD.FetchReq
f) NEFFunction
g) Valid for packet switched traffic
h) 5GS 5.9.x.4.2 Number of Successful PFD Fetch
a) This measurement provides the number of successful PFD fetch at NEF.
b) CC c) Transmission of an Nnef_PFDManagement_Fetch Response by the NEF to SMF indicating a successful PFD fetch.
d) An integer value
e) PFD.FetchSucc
f) NEFFunction
g) Valid for packet switched traffic
h) 5GS 5.9.x.5 PFD Subscription 5.9.x.5.1 Number of PFD Subscribing Requests
a) This measurement provides the number of HD subscribing requests received by the NEF from SMF.
b) CC
c) Receipt of an Nnef_PFDManagement_Subscribe Request by the NEF from SMF.
d) An integer value
e) PFD.SubscribeReq
f) NEFFunction
g) Valid for packet switched traffic
h) 5GS 5.9.x.5.2 Number of Successful PFD Subscriptions
a) This measurement provides the number of successful PFD subscriptions at NEF.
b) CC
c) Transmission of an Nnef_PFDmanagement_Subscribe Response by the NEF to SMF indicating a successful PFD subscribe.
d) An integer value
e) PFD.SubscribeSucc
f) NEFFunction
g) Valid for packet switched traffic
h) 5GS 5.8.x QoS Flow Management 5.8.x.z QoS Flow Release Via Untrusted Non-3GPP Access 5.8.x.z.1 Number of QoS Flows Attempted to Release
a) This measurement provides the number of QoS flows attempted to release via untrusted non-3GPP access. The measurement is split into subcounters per QoS level (5QI) and subcounters per network slice identifier (S-NSSA1).
b) CC.
c) Receipt by the N3IWF of a PDU SESSION RESOURCE RELEASE COMMAND, PDU SESSION RESOURCE MODIFY REQUEST or UE CONTEXT RELEASE COMMAND message from AMF. Each QoS flow requested to release increments the relevant subcounter per 5QI and the relevant subcounter per S-NSSAI by 1 respectively.
d) Each measurement is an integer value,
e) QF.RelNbrUntrustNon3gppAtt.5QI, where 5QI identifies the 5QI, and
QF.RelNbrUntrustNon3gppAtt.SNSSAI, where SNSSAI identifies the S-NSSAI,
f) N3IWFFunction.
g) Valid for packet switched traffic.
h) 5GS.

5.8.x.z.2 Number of QoS Flows Successfully Released
a) This measurement provides the number of QoS flows successfully released via untrusted non-3GPP access. The measurement is split into subcounters per QoS level (5QI) and subcounters per network slice identifier (S-NSSA1).
b) CC.
c) Transmission by the N3IWF of a PDU SESSION RESOURCE RELEASE RESPONSE, PDU SESSION RESOURCE MODIFY RESPONSE or UE CONTEXT RELEASE COMPLETE message. Each QoS flow requested to release increments the relevant subcounter per 5QI and the relevant subcounter per S-NSSAI by 1 respectively.
d) Each measurement is an integer value,
e) QF.RelNbrUntrustNon3gppSucc.5QI, where 5QI identifies the 5QI, and
QF,ReiNbrUntrustNon3gppSucc.SNSSAI, where SNSSAI identifies the S-NSSAI.
f) N3IWFFunction,
g) Valid for packet switched traffic.
h) 5GS.

5.8.x.z.3 Number of Released Active QoS Flows
a) This measurement provides the number of released QoS flows that were active at the time of release via tin trusted non-3GPP access. QoS flows with bursty flow are seen as being active when there is user data in the queue in any of the directions, QoS flows with continuous flow are always seen as active QoS flows in the context of this measurement. This measurement is split into subcounters per QoS level (5QI) and subcounters per network slice identifier (S-NSSAI).
b) CC.
c) Transmission by the N3IWF of a PDU SESSION RESOURCE RELEASE RESPONSE message for the PDU session resource release initiated by the AMF with the exception of corresponding PDU SESSION RESOURCE RELEASE COMMAND message with "Cause" equal to "Normal Release" or "User inactivity", "Load balancing TAU required", "Release due to CN-detected mobility", "O&M intervention", or transmission by the PDU SESSION RESOURCE MODIFY RESPONSE message for the PDU session resource modification initiated by the AMF with the exception of corresponding PDU SESSION RESOURCE MODIFY REQUEST message with the "Cause" equal to "Normal Release", or transmission by the N3IWF of UE CONTEXT RELEASE COMPLETE for the UE context release initiated by the N3IWF with the exception of the corresponding UE CONTEXT RELEASE REQUEST message with the cause equal to "Normal Release" or "User inactivity", "Partial handover", "Successful handover", or transmission by the N3IWF of UE CONTEXT RELEASE COMPLETE message for the UE context release initiated by the AMF with the exception of the corresponding UE CONTEXT RELEASE COMMAND message with "Cause" equal to "Normal Release", "Handover Canceled" or a successful mobility activity (e.g., cause "Successful Handover", or "NG Intra system Handover triggered"), or receipt by the N3IWF of a PATH SWITCH REQUEST ACKNOWLEDGE or PATH SWITCH REQUEST FAILED message by which some or all QoS flows in the corresponding PATH SWITCH REQUEST need to be released, or transmission by the N3IWF of a NG RESET ACKNOWLEDGE message to AMF; or receipt by the N3IWF of a NG RESET ACKNOWLEDGE message from AMF; if any of the UL or DL of the QoS flow is considered active.

QoS flows with bursty flow are considered active when there is still data transmission in the DL or UL. QoS flows with continuous flow are always seen as active QoS flows in the context of this measurement. Each released active QoS flow increments the relevant subcounter per QoS level (5QI) and subcounters per network slice identifier (S-NSSAI) by 1 respectively.

How to define for a particular 5QI if the QoS flow is of type bursty flow or continuous flow is outside the scope of this document.
d) Each measurement is an integer value.
e) QF.RelActNbrUntrustNon3gpp.5QI, where 5QI identifies the 5QI, and QF.RelActNbrUntrustNon3 pp.SNSSAI, where SNSSAI identifies the S-NSSAI.
f) N3IWFFunction.
g) Valid for packet switched traffic.
h) 5GS.

5.1.1.6 Mobility Management
5.1.1.6.1 Inter-gNB Handovers
5.1.1.6.1.1 Number of Requested Handover Preparations
a) This measurement provides the number of handover preparations requested by the source gNB.
b) CC.
c) On transmission of HANDOVER REQUIRED message by the NR cell Cu to the AMF, or transmission of HANDOVER REQUEST message by the source NR cell Cu to target NR cell CU, for requesting the preparation of resources at the target NR cell CU.
d) A single integer value.
e) MM.HoPrepInterReq.
f) NRCellCU, NRCell Relation.
g) Valid for packet switched traffic.
h) 5GS.
i) One usage of this performance measurements is for performance assurance.

5.1.1.6.1.2 Number of Successful Handover Preparations
a) This measurement provides the number of successful handover preparations received by the source NR cell CU.
b) CC
c) On receipt of HANDOVER COMMAND message by the NR cell Cu from the AMF, or receipt of HANDOVER REQUEST ACKNOWLEDGE message by the source NR cell Cu from the target NR cell CU, for informing that the resources for the handover have been prepared at the target NR cell CU.
d) A single integer value.
e) MM.HoPrepInterSucc.
f) NRCellCU, NRCellRelation.
g) Valid for packet switched traffic.
h) 5GS.
i) One usage of this performance measurements is for performance assurance.

5.1.1.6.13 Number of Failed Handover Preparations
a) This measurement provides the number of failed handover preparations received by the source NR cell CU. This measurement is split into subcounters per failure cause.
b) CC
c) On receipt of HANDOVER PREPARATION FAILURE message by the NR cell Cu from the AMF, or receipt of HANDOVER PREPARATION FAILURE message by the source NR cell Cu from the target NR cell CU, for informing that the preparation of resources at the target NR cell Cu has failed. Each received HANDOVER PREPARATION FAILURE message increments the relevant subcounter per failure cause by 1.
d) Each subcounter is an integer value.
e) MM.HoPrepInterFail.cause.
Where cause identifies the failure cause of the handover preparations.
f) NRCellCU, NRCellRelation.
g) Valid for packet switched traffic.
h) 5GS
i) One usage of this performance measurements is for performance assurance.

5.1.1.6.1.4 Number of Requested Hand Over Resource Allocations
a) This measurement provides the number of handover resource allocation requests received by the target NR cell CU.
b) 1CC
c) On receipt of HANDOVER REQUEST message by the NR cell Cu from the AMF, or receipt of HANDOVER REQUEST message by the target NR cell Cu from the source NR cell CU, for requesting the preparation of resources for handover.
d) A single integer value.
e) MM.HoResAlloInterReq.
f) NRCellCU, NRCellRelation.
g) Valid for packet switched traffic.
h) 5GS.
i) One usage of this performance measurements is for performance assurance.

5.1.1.6.1.5 Number of Successful Handover Resource Allocations
a) This measurement provides the number of successful handover resource allocations at the target NR cell CU for the handover.
b) CC.
c) On transmission of HANDOVER REQUEST ACKNOWLEDGE message by the NR cell Cu to the AMF, or transmission of HANDOVER REQUEST ACKNOWLEDGE message by the target NR cell Cu to the source NR cell CU, for informing that the resources for the handover have been prepared.
d) A single integer value.
e) MM.HoResAlloInterSucc
f) NRCellCU, NRCellRelation.
g) Valid for packet switched traffic.
h) 5GS,
i) One usage of this performance measurements is for performance assurance.

5.1.1.6.1.6 Number of Failed Handover Resource Allocations
a) This measurement provides the number of failed handover resource allocations at the target NR cell CU for the handover. This measurement is split into subcounters per failure cause.
b) CC
c) On transmission of HANDOVER FAILURE message by the NR cell Cu to the AMF, or transmission of HANDOVER PREPARATION FAILURE message by the target NR cell Cu to the source NR cell CU, for informing that the preparation of resources has failed. Each transmitted HANDOVER FAILURE message or HANDOVER PREPARATION FAILURE message increments the relevant subcounter per failure cause by 1.
d) Each subcounter is an integer value.
e) MM.HoResAlloInterFail.cause
Where cause identifies the failure cause of the Handover resource allocations,
f) NRCellCU, NRCellRelation.
g) Valid for packet switched traffic.
h) 5GS
i) One usage of this performance measurements is for performance assurance.

5.1.01.6.1.7 Number of Requested Handover Executions
a) This inter gNB handover measurement provides the number of outgoing handover executions requested by the source gNB.
b) CC.
c) On transmission of RRC ConnectionReconfiguration message to the UE, triggering the inter gNB handover from the source NRCellCU to the target NRCellCU, indicating the attempt of an outgoing inter-gNB handover, the counter is stepped by 1.
d) A single integer value.
e) MM.HoExeInterReq.
f) NRCellCU, NRCellRelation.
g) Valid for packet switched traffic.
h) 5GS.
i) One usage of this performance measurement is for performance assurance.

5.1.1.6.1.8 Number of Successful Handover Executions
a) This inter-gNB handover measurement provides the number of successful handover executions received by the source gNB.
b) CC
c) On receipt at the source gNB of UE CONTEXT RELEASE over Xn from the target gNB following a successful handover, or, if handover is performed via NG, on receipt of UE CONTEXT RELEASE COMMAND from AME following a successful inter gNB handover, the counter is stepped by 1.
d) A single integer value.
e) MM.HoExeInterSucc.
f) NRCellCU, NRCellRelation.
g) Valid for packet switched traffic.
h) 5GS.
i) One usage of this performance measurement is for performance assurance.

5.1.1.6.1.9 Number of Failed Handover Executions
a) This inter gNB handover measurement provides the number of faded handover executions received by the source gNB. This measurement is split into subcounters per failure cause.
b) CC.
c) On receipt at the source gNB of UE CONTEXT RELEASE over Xn from the target gNB indicating an unsuccessful inter gNB handover, or, if handover is performed via NG, on receipt of UE CONTEXT RELEASE COMMAND from AMF indicating an unsuccessful inter gNB handover.
The failure causes are listed for the UE CONTEXT RELEASE in and for UE CONTEXT RELEASE COMMAND in. Each received message increments the relevant subcounter per failure cause by 1.
d) Each subcounter is an integer value.
e) MM.HoExeinterFail.cause.
Where cause identifies the failure cause of the UE CONTEXT RELEASE or UE CONTEXT RELEASE COMMAND message.
f) NRCellCU, NRCellRelation.
g) Valid for packet switched traffic.
h) 5GS.
i) One usage of this performance measurement is for performance assurance.

5.1.1.6.1.10 Mean Time of Requested Hand Over Executions
a) This measurement provides the mean time of Inter-gNB handover executions during each granularity period. The measurement is split into subcounters per S-NSSAI.
b) DER(n=1)
c) This measurement is obtained by accumulating the time interval for every successful Inter-gNB handover executions procedure per S-NSSAI between the receipt by the Source NG-RAN from the Target NG-RAN of a "Release Resource" and the sending of a "N2 Path Switch Request" message from Source NG-RAN to the Target NG-RAN over a granularity period using DER, The end value of this time will then be divided by the number of Inter-gNB handovers observed in the granularity period to give the arithmetic mean, the accumulator shall be reinitialised at the beginning of each granularity period,
d) Each measurement is an integer value (in milliseconds)
e) MM.HoExeInterReq.TimeMean.SNSSAI
f) NRCellCU, NRCellRelation.
g) Valid for packet switched traffic
h) 5GS
i) One usage of this measurement is for monitoring the mean time of Inter-gNB handovers during the granularity period.

5.1.1.6.1.11 Max Time of Requested Handover Executions
a) This measurement provides the max time of Inter-gNB handover executions during each granularity period. The measurement is split into subcounters per S-NSSAI.
b) DER(n=1)
c) This measurement is obtained by measuring the time interval for every successful Inter-gNB handover executions procedure per S-NSSAI between the receipt by the Source NG-RAN from the Target NG-RAN of a "Release Resource" and the sending of a "N2 Path Switch Request" message from Source NG-RAN to the Target NG-RAN over a granularity period using DER. The high tide mark of this time will be stored in a gauge, the gauge shall be reinitialised at the beginning of each granularity period.
d) Each measurement is an integer value (in milliseconds)
e) MM.HoExeInterReq.TimeMax.SNSSAI
f) NRCellCU, NRCellRelation.
g) Valid for packet switched traffic
h) 5GS
i) One usage of this measurement is for monitoring the mean time of Inter-gNB handovers during the granularity period.

5.1.1.6.2 Intra-gNB Handovers
5.1.1.6.2.1 Number of Requested Handover Executions
a) This measurement provides the number of outgoing intra-gNB handover executions requested by the source NR cell CU.
b) CC.
c) On transmission of RRC ConnectionReconfiguration message to the UE, triggering the handover from the source NRCellCU to the target NR cell CU, indicating the attempt of an outgoing intra-gNB handover, the counter is sloped by 1.
d) A single integer value.
e) MM.HoExeintraReq.
f) NRCellCU, NRCellRelation.
g) Valid for packet switched traffic.
h) 5GS.
i) One usage of this performance measurement is for performance assurance.

5.1.1.6.2.2 Number of Successful Handover Executions
a) This measurement provides the number of successful intra-gNB handover executions received by the source NR cell CU.
b) CC.
c) On reception of RRC ConnectionReconfigurationComplete message from the UE to the target NR cell CU indicating a successful intra-gNB handover, the counter is stepped by 1.
d) A single integer value.
e) MM.HoExeIntraSucc.
f) NRCellCU, NRCellRelation,
g) Valid for packet switched traffic.
h) 5GS.
i) One usage of this performance measurement is for performance assurance.

Figure 6:
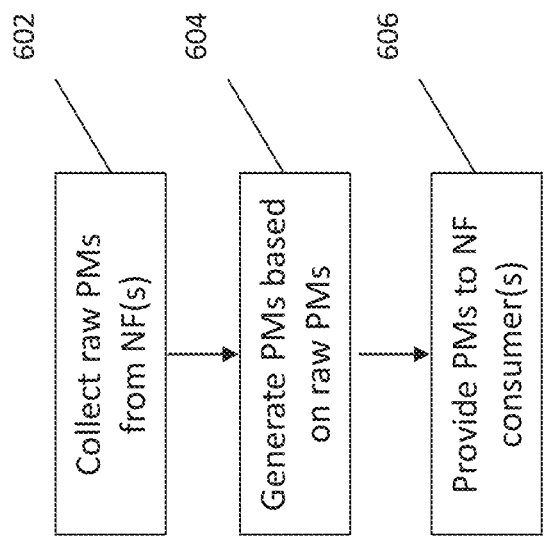
FIG. 6 shows a method of providing performance measurements in accordance with some embodiments.

FIG. 6 shows a method of providing performance measurements in accordance with some embodiments. Although only certain operations are shown, other operations may be present. As shown, the method may include, at operation 602, collecting raw performance measurements from one or more NFs. A trigger event (or condition) may trigger collection of the raw performance measurements. The NFs may be any of the NFs described in FIGS. 5A-5E. At operation 604, measurement results may be generated based on the raw performance measurements collected at operation 602. At operation 606, the measurement results generated at operation 604 may be provided to one or more NF consumers (receivers). The measurement results may be provided to the one or more NF consumers periodically. In some cases, the measurement results may be reset after providing the measurement results to the one or more NF consumers.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter les in less than all features of a single disclosed embodiment. Thus, the following claims are hereby incorporated into the Detailed Description, with each claim standing on its own as a separate embodiment.

What is claimed is:

1. An apparatus comprising processing circuitry and memory to configure the apparatus to operate as a performance measurement service producer for a fifth generation (5G) network to:
   collect performance measurement data from a 5G network function (NF), the 5G NF being at least one of a next generation random access network (NG-RAN), a policy control function (PCF), a NF repository function (NRF), a network exposure function (NEF), and a Non-3GPP Interworking Function (N3IWF); and
   provide performance measurements based on the performance measurement data to a performance measurement service consumer for at least one of resource utilization, operating problem diagnosis, and network availability monitoring, for performance measurements related to NF service management,
   wherein the measurement results include a number of NF service registration requests received at the NRF, a number of successful NF service registrations at the NRF, a number of failed NF service registrations at the NRF due to an encoding error of an NF profile, a number of failed NF service registrations at the NRF due to an NRF internal error, a number of NF service update requests received at the NRF, a number of successful NF service updates at the NRF, a number of failed NF service updates at the NRF due to an encoding error of a NF profile, and a number of failed NF service registrations at the NRF due to an NRF internal error.

2. The apparatus of claim 1, wherein the 5G NF is an NRF that maintains information of available NF instances and supported services.

3. The apparatus of claim 2, wherein the measurement results include at least one of a number of NF service discovery requests for an NF service received at the NRF, a number of successful NF service discoveries at the NRF, and a number of failed NF service discoveries at the NRF due to: the performance measurement service receiver not being allowed to discover the NF service, errors in input data in Uniform Resource Identifier (URI) query parameters, and an NRF internal error.

4. The apparatus of claim 1, wherein the 5G NF is a PCF and, for performance measurements related to user equipment (UE) policy association, the measurement results include at least one of a number of UE policy association requests received at the PCF and a number of successful UE policy associations at the PCF.

5. The apparatus of claim 1, wherein the 5G NF is a NEF and, for performance measurements related to Packet Flow Description (PFD) management, the measurement results include at least one of: a number of PFD creation requests received at the NEF from an application function (AF), a number of successful PFD creations at the NEF, a number of PFD update requests received at the NEF from the AF, a number of successful PFD updates at the NEF, a number of PFD deletion requests received at the NEF from the AF, a number of successful PFD deletions at the NEF, a number of PFD fetch requests received at the NEF from a session management function (SMF), a number of successful PFD fetches at the NEF, a number of PFD subscribing requests received at the NEF from the SMF, and a number of successful PFD subscriptions at the NEF.

6. The apparatus of claim 1, wherein the 5G NF is a N3IWF and, for performance measurements related to quality of service (QoS) flow release, the measurement results include at least one of: a number of QoS flows attempted to release via untrusted non-third generation partnership project (3GPP) access split into subcounters per QoS level (5QI) and subcounters per network slice identifier (S-NSSAI), a number of QoS flows successfully released via the untrusted non-3GPP access split into subcounters per QoS level and subcounters per S-NSSAI, and a number of released QoS flows that were active at a time of release via the untrusted non-3GPP access split into subcounters per QoS level and subcounters per S-NSSAI.

7. The apparatus of claim 1, wherein the 5G NF is a fifth generation NodeB (gNB) and, for performance measurements related to handovers, the measurement results include at least one of: a number of handover preparations requested by a source gNB, a number of successful handover preparations received by a source NR cell central unit (CU), a number of failed handover preparations received by the source NR cell CU split into subcounters per failure cause, a number of handover resource allocation requests received by a target NR cell CU, a number of successful handover resource allocations at the target NR cell CU for a handover, a number of failed handover resource allocations at the target NR cell CU for the handover, a number of outgoing handover executions requested by the source gNB, a number of successful handover executions received by the source gNB, a number of failed handover executions received by the source gNB split into subcounters per failure cause, a mean time of inter-gNB handover executions during each granularity period split into subcounters per S-NSSAI, a number of outgoing intra-gNB handover executions requested by the source NR cell CU, and a number of successful intra-gNB handover executions received by the source NR cell CU.

8. The apparatus of claim 1, wherein the processing circuitry is to configure the NRF to receive, from each NF of a plurality of NFs, a list of NF services supported by the NF.

9. The apparatus of claim 1, wherein an NF service is exposed by the performance measurement Service Producer to the performance measurement Service Consumer through a service-based interface.

10. The apparatus of claim 1, wherein the processing circuitry is to configure the performance measurement service producer to discover a set of NF instances and NF service instances for a specific NF service or an NF type.

11. The apparatus of claim 1, wherein a failed NF service registration or update of an NF service results in an inability of at least one of:
the NRF to discover or consume the NF service by an NF consumer, and
the NF service to receive notifications for other NF services that the NF service is to consume.

12. A non-transitory computer-readable storage medium that stores instructions for execution by one or more processors configured to operate as a performance measurement service producer for a fifth generation (5G) network, the instructions when executed configure the one or more processors to:
collect performance measurement data from a 5G network function (NF), the 5G NF being at least one of a next generation random access network (NG-RAN), a policy control function (PCF), a NF repository function (NRF), a network exposure function (NEF), and a Non-3GPP Interworking Function (N3IWF); and
provide performance measurements based on the performance measurement data to a performance measurement service consumer for at least one of resource utilization, operating problem diagnosis, and network availability monitoring, for performance measurements related to NF service management,
wherein the measurement results include a number of NF service registration requests received at the NRF, a number of successful NF service registrations at the NRF, a number of failed NF service registrations at the NRF due to an encoding error of an NF profile, a number of failed NF service registrations at the NRF due to an NRF internal error, a number of NF service update requests received at the NRF, a number of successful NF service updates at the NRF, a number of failed NF service updates at the NRF due to an encoding error of a NF profile, and a number of failed NF service registrations at the NRF due to an NRF internal error.

13. The medium of claim 12, wherein the measurement results include at least one of a number of NF service discovery requests for an NF service received at the NRF, a number of successful NF service discoveries at the NRF, or a number of failed NF service discoveries at the NRF due to: the performance measurement service receiver not being allowed to discover the NF service, errors in input data in Uniform Resource Identifier (URI) query parameters, or an NRF internal error.

14. The medium of claim 12, wherein for performance measurements related to user equipment (UE) policy association, the measurement results include at least one of a number of UE policy association requests received at the PCF or a number of successful UE policy associations at the PCF.

15. The medium of claim 12, wherein for performance measurements related to Packet Flow Description (PFD) management, the measurement results include at least one of: a number of PFD creation requests received at the NEF from an application function (AF), a number of successful PFD creations at the NEF, a number of PFD update requests received at the NEF from the AF, a number of successful PFD updates at the NEF, a number of PFD deletion requests received at the NEF from the AF, a number of successful PFD deletions at the NEF, a number of PFD fetch requests received at the NEF from a session management function (SMF), a number of successful PFD fetches at the NEF, a number of PFD subscribing requests received at the NEF from the SMF, or a number of successful PFD subscriptions at the NEF.

16. The medium of claim 12, wherein for performance measurements related to quality of service (QoS) flow release, the measurement results include at least one of: a number of QoS flows attempted to release via untrusted non-third generation partnership project (3GPP) access split into subcounters per QoS level (5QI) and subcounters per network slice identifier (S-NSSAI), a number of QoS flows successfully released via the untrusted non-3GPP access split into subcounters per QoS level and subcounters per S-NSSAI, or a number of released QoS flows that were active at a time of release via the untrusted non-3GPP access split into subcounters per QoS level and subcounters per S-NSSAI.

17. The medium of claim 12, wherein for performance measurements related to handovers, the measurement results include at least one of: a number of handover preparations requested by a source gNB, a number of successful handover preparations received by a source NR cell central unit (CU), a number of failed handover preparations received by the source NR cell CU split into subcounters per failure cause, a number of handover resource allocation requests received by a target NR cell CU, a number of successful handover resource allocations at the target NR cell CU for a handover, a number of failed handover resource allocations at the target NR cell CU for the handover, a number of outgoing handover executions requested by the source gNB, a number of successful handover executions received by the source gNB, a number of failed handover executions received by the source gNB, a mean time of inter-gNB handover executions during each granularity period split into subcounters per S-NSSAI, a number of outgoing intra-gNB handover executions requested by the source NR cell CU, and a number of successful intra-gNB handover executions received by the source NR cell CU.

18. An apparatus comprising processing circuitry and memory to configure the apparatus to operate as a network function (NF) in a next generation (NG) network, the instructions when executed configure the one or more processors to:
determine whether a condition to update measurement result data at the NF has occurred, the NF being at least one of a next generation random access network (NG-RAN), a policy control function (PCF), a network function (NF) repository function (NRF), a network exposure function (NEF), and a Non-3GPP Interworking Function (N3IWF); and
in response to a determination that the condition has occurred, update measurement result data at a performance measurement service producer by providing performance measurements, for performance measurements related to NF service management,
wherein the measurement result data includes a number of NF service registration requests received at the NRF, a number of successful NF service registrations at the NRF, a number of failed NF service registrations at the NRF due to an encoding error of an NF profile, a number of failed NF service registrations at the NRF due to an NRF internal error, a number of NF service update requests received at the NRF, a number of successful NF service updates at the NRF, a number of failed NF service updates at the NRF due to an encoding error of a NF profile, and a number of failed NF service registrations at the NRF due to an NRF internal error.

19. The medium of claim 18, wherein:
when the NF is an NRF, the PMs are related to NF service registrations, NF service updates or NF service discoveries,
when the NF is a PCF, the PMs are related to user equipment (UE) policy associations,
when the NF is a NEF, the PMs are related to Packet Flow Descriptions (PFDs),
when the NF is a N3IWF, the PMs are related to quality of service (QoS) flows, and
when the NF is a fifth generation NodeB (gNB), the PMs are related to handovers.

20. A non-transitory computer-readable storage medium that stores instructions for execution by one or more processors configured to operate as a network function (NF) in a next generation (NG) network, the instructions when executed configure the one or more processors to:
determine whether a condition to update measurement result data at the NF has occurred, the 5G network function (NF) being at least one of a next generation random access network (NG-RAN), a policy control function (PCF), a network function (NF) repository function (NRF), a network exposure function (NEF) and a Non-3GPP Interworking Function (N3IWF); and
in response to a determination that the condition has occurred, update measurement result data at a performance measurement service producer by providing performance measurements, for performance measurements related to NF service management,
wherein the measurement result data includes a number of NF service registration requests received at the NRF, a number of successful NF service registrations at the NRF, a number of failed NF service registrations at the NRF due to an encoding error of an NF profile, a number of failed NF service registrations at the NRF due to an NRF internal error, a number of NF service update requests received at the NRF, a number of successful NF service updates at the NRF, a number of failed NF service updates at the NRF due to an encoding error of a NF profile, and a number of failed NF service registrations at the NRF due to an NRF internal error.

21. The medium of claim 20, wherein:
when the NF is an NRF, the performance measurements (PMs) are related to NF service registrations, NF service updates or NF service discoveries,
when the NF is a PCF, the PMs are related to user equipment (UE) policy associations,
when the NF is a NEF, the PMs are related to Packet Flow Descriptions (PFDs),
when the NF is a N3IWF, the PMs are related to quality of service (QoS) flows, and
when the NF is a fifth generation NodeB (gNB), the PMs are related to handovers.

* * * * *